United States Patent
Choi et al.

(10) Patent No.: US 12,184,156 B2
(45) Date of Patent: Dec. 31, 2024

(54) ROTOR COOLING STRUCTURE FOR INDUCTION MOTOR

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Jin Ho Choi, Suwon-Si (KR); Jong Seok Lee, Suwon-Si (KR); Sang Jin Park, Hwaseong-Si (KR); Sung Woo Hwang, Seoul (KR); Jae Hyun Kim, Seoul (KR); Myung Seop Lim, Seoul (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 255 days.

(21) Appl. No.: 17/845,802

(22) Filed: Jun. 21, 2022

(65) Prior Publication Data
US 2023/0170762 A1 Jun. 1, 2023

(30) Foreign Application Priority Data
Nov. 30, 2021 (KR) .................. 10-2021-0169487

(51) Int. Cl.
*H02K 9/06* (2006.01)
*H02K 17/16* (2006.01)

(52) U.S. Cl.
CPC ............... *H02K 9/06* (2013.01); *H02K 17/16* (2013.01)

(58) Field of Classification Search
CPC ............ H02K 9/06; H02K 1/32; H02K 17/16; H02K 17/20
(Continued)

(56) References Cited

U.S. PATENT DOCUMENTS 1,861,059 A * 5/1932 Johnson .................. H02K 17/16
310/63
2,176,871 A * 10/1939 Harrell ............... H02K 15/0012
310/211
(Continued)

FOREIGN PATENT DOCUMENTS

CN 1286821 A 3/2001
EP 1 050 949 A 8/2000
(Continued)

*Primary Examiner* — Burton S Mullins
(74) *Attorney, Agent, or Firm* — Morgan, Lewis & Bockius LLP

(57) ABSTRACT

A rotor cooling structure includes a turbine blower structure provided on first and second sides of a rotor for an induction motor; a refrigerant passage including a plurality of refrigerant passage inlet openings provided on a bottom surface of the turbine blower structure and a plurality of refrigerant passage outlet openings provided at an axial center of the rotor, which fluidically communicates with the refrigerant passage inlet openings and the refrigerant passage outlet openings and is provided along conductor bars of the rotor; and a plurality of micro groove patterns that hold the refrigerant passage outlet openings and are provided on both axial sides of the rotor on an external periphery of the rotor.

15 Claims, 4 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 3,328,616 | A * | 6/1967 | Ringland | ............... H02K 17/16 |
| | | | | 310/268 |
| 3,684,906 | A * | 8/1972 | Lenz | ...................... H02K 17/16 |
| | | | | 310/64 |
| 4,341,966 | A * | 7/1982 | Pangburn | ................. H02K 1/32 |
| | | | | 310/64 |
| 5,718,302 | A * | 2/1998 | Hasebe | .................. H02K 7/116 |
| | | | | 180/65.6 |
| 7,411,323 | B2 * | 8/2008 | Pfannschmidt | .......... H02K 1/32 |
| | | | | 310/58 |
| 9,680,340 | B2 * | 6/2017 | Noack | ...................... H02K 9/06 |
| 2013/0293048 | A1 | 11/2013 | Oh et al. | |
| 2020/0204044 | A1 | 6/2020 | Lee et al. | |

FOREIGN PATENT DOCUMENTS

| | | |
|---|---|---|
| EP | 3 644 480 A | 4/2020 |
| JP | 3855658 B | 12/2006 |
| JP | 2013-234750 A | 11/2013 |
| KR | 2001-0034236 A | 4/2001 |
| KR | 2013-0123253 A | 11/2013 |

\* cited by examiner

ROTOR COOLING STRUCTURE FOR INDUCTION MOTOR

CROSS-REFERENCE TO RELATED APPLICATION

The present application claims priority to Korean Patent Application No. 10-2021-0169487 filed on Nov. 30, 2021, the entire contents of which is incorporated herein for all purposes by this reference.

BACKGROUND OF THE PRESENT DISCLOSURE

Field of the Present Disclosure

The present disclosure relates to a rotor cooling structure for an induction motor.

Description of Related Art

The description in the present section merely provides background information related to the present disclosure and does not necessarily constitute the related art.

In induction motors which are asynchronous motors, the rotor's magnetic field is not in synchronism with the rotor's mechanical rotation rate, and the slip between the rotation rate of the magnetic field and the rotation rate of the stator varies with rotation speed. That is, the magnetic density of the rotor's core is not consistent, but varies alternately.

An iron loss occurs due to an alternating magnetic field, and the rotor of an induction motor has more iron losses than the rotor of a synchronous motor. Induction motors used for vehicles are more affected by iron losses because they are required to change rotation speed more frequently compared to industrial motors which rotate at constant speed in a low slip state, and this results in excessive heat generation in the rotor.

When an induction motor is run, heat is generated as a high-density current flows in a resistor. Notably, armature windings and the rotor's conductor bars generate high-temperature heat due to copper losses. The rise in the temperature of the conductor bars leads to increased specific resistance and therefore lowers motor efficiency due to increased copper losses. For the induction motor to produce a high output, a high current needs to be applied, and an efficient cooling structure is required to suppress a resistance increase caused by a temperature increase in the armature windings and the conductor bars.

Meanwhile, induction motors are harder to control than synchronous motors, because, in the case of the induction motors, the magnitude of current induced in the rotor's conductor bars and the magnitude of a magnetic flux generated by the present current vary with frequently varying slip. Here, the magnitude of a magnetic flux induced in the rotor's conductor bars is a function of conductor bar resistance. As resistance changes, the control characteristics vary, making it difficult to perform accurate motor control. That is, the resistance of the conductor bars is the most dominant factor determining the characteristics of the induction motor.

It is very important to obtain an accurate value of rotor resistance which is not constant, to provide accurate control of induction motors, increase efficiency, and produce high output. GM utilizes a dual resistance estimation model to form a more precise estimate of the resistance of the conductor bars depending on load conditions, based on the fact that the heat generation behavior of the conductor bars changes depending on the required torque. Also, rotor cooling is necessary to use an induction motor as an electric motor for driving a vehicle, in which case the power-to-weight ratio of the induction motor is important. Tesla made a great improvement on the power output of induction motors by employing shaft core cooling applied in the main axis of a machine tool in induction motor rotors.

Whereas industrial induction motors which are usually run at low current density are generally air cooling type, induction motors for vehicles require a more aggressive cooling structure in view of the above-described characteristics. That is, they require a cooling method that makes the estimation of the temperature of the conductor bars easier to improve control precision for loss reduction and efficiency improvement, and that effectively suppresses heat generation to produce high output.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a cooling structure that effectively cools heat generated from the rotor of an induction motor.

According to at least an exemplary embodiment of the present disclosure, the present disclosure provides a rotor cooling structure including: a turbine blower structure provided on first and second sides of a rotor for an induction motor: a refrigerant passage including a plurality of refrigerant passage inlet openings provided on a bottom surface of the turbine blower structure and a plurality of refrigerant passage outlet openings provided at an axial center of the rotor, which fluidically communicates with the refrigerant passage inlet openings and the refrigerant passage outlet openings and is provided along conductor bars of the rotor; and a plurality of micro groove patterns that hold the refrigerant passage outlet openings and are provided on both axial sides of the rotor on an external periphery of the rotor.

According to another exemplary embodiment of the present disclosure, the present disclosure provides an induction motor including the rotor cooling structure, further including an oil mist supply device on an external side of the turbine blower structure.

A rotor cooling structure according to an exemplary embodiment of the present disclosure has an effect of effectively cooling heat generated from the rotor, because a refrigerant flows along the inside or outside of conductor bars on both sides of the rotor and is then released into an air gap between the rotor and a stator because the refrigerant outside the rotor is drawn into the rotor by a turbine blower structure provided on both sides of the rotor, and the refrigerant in the air gap is released back to both sides of the rotor by a flow pressure generated by micro groove patterns formed on an external periphery of the rotor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
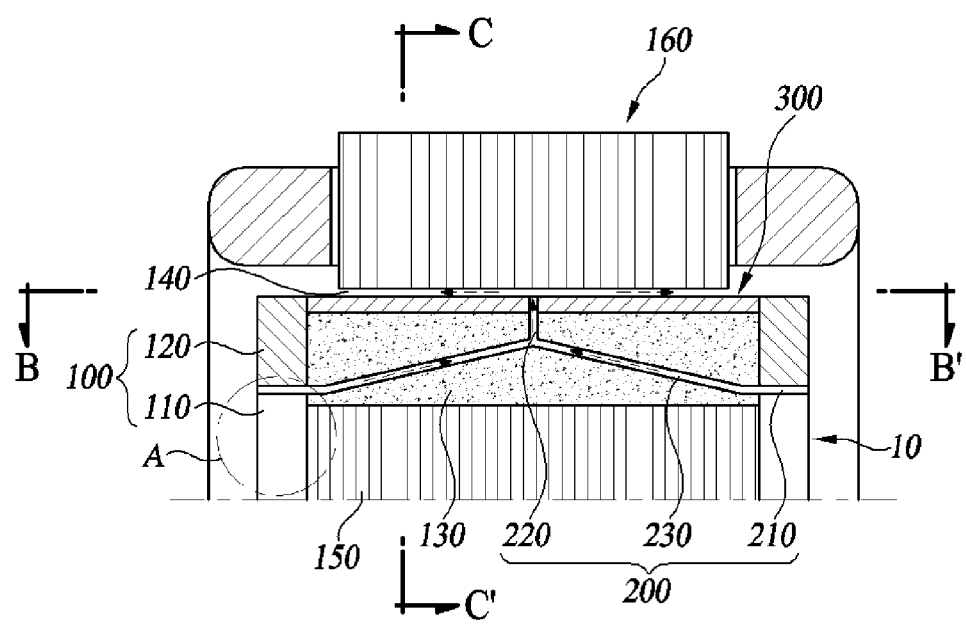
FIG. 1 illustrates a rotor cooling structure according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Some exemplary embodiments of the present disclosure are described below with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated herein will be omitted for clarity and for brevity.

Additionally, alphanumeric codes such as first, second, i), ii), a), b), etc., in numbering components are used solely for differentiating one component from the other but not to imply or suggest the substances, the order, or sequence of the components. Throughout the present specification, when parts "include" or "comprise" a component, they are meant to further include other components, not excluding thereof unless there is a description contrary thereto.

FIG. 1 illustrates a rotor cooling structure according to an exemplary embodiment of the present disclosure.

Referring to FIG. 1, a rotor cooling structure according to an exemplary embodiment of the present disclosure includes a turbine blower structure 100, a refrigerant passage 200, and micro groove patterns 300.

The turbine blower 110 is configured to draw air and/or refrigerant in an area adjacent to opposite sides of a rotor 10 into the refrigerant passage 200. The turbine blower structure 100 is provided on both axial sides of the rotor 10. The turbine blower structure 100 according to various exemplary embodiments of the present disclosure may be provided on an end-ring 120 of the rotor 10. The end-ring 120 may be formed on an axial external side of the rotor 10. The end-ring 120 may have two circular structures. The end-ring 120 may be formed on a radial external side of the rotor 10 to serve its conventional role, and the turbine blower structure 100 may be formed on a radial internal side of the rotor 10. A bottom surface 112 of the turbine blower 110 may fluidically communicate with the refrigerant passage 200. Air and/or refrigerant in an area outside the turbine blower structure 100 may be introduced into the refrigerant passage 200 by a dynamic pressure formed by the rotation of the rotor 10. The turbine blower 110 may have such a size or capacity that allows the refrigerant to smoothly flow along the refrigerant passage 200 and minimizes an increase in rotation loss caused by the turbine blower 100. The turbine blower structure 100 may be preformed integrally with the end-ring 120 and then attached to conductor bars 130 of the rotor 10, or it may be attached to the rotor 10 and then post-processed by milling using a typical five-axis machine.

The refrigerant passage 200 may have inlet openings 210 fluidically communicating to through-holes 114 in the bottom surface 112 of the turbine blower 110 and outlet openings 220 on an external periphery thereof, which is positioned at an axial center of the rotor 10 and runs toward an air gap 140, and an internal refrigerant passage 230 connecting the refrigerant passage inlet openings 210 and the refrigerant passage outlet openings 220, which is formed through the inside of the conductor bars 130 or along the outside of the conductor bars 130. Also, the internal refrigerant passage 230 may be formed so that a position provided from one side of the rotor 10 is farther away from the refrigerant passage inlet openings 210 formed at the rotor 11 toward the refrigerant passage outlet openings 220, so that the centrifugal force of the rotor 10 contributes to the movement of the refrigerant flowing along the internal refrigerant passage 230. That is, the internal refrigerant passage 230 may be sloped as it extends radially inwardly from the refrigerant passage inlet openings 210 toward the refrigerant passage outlet openings 220 so that the centrifugal force becomes larger toward the refrigerant passage outlet openings 220.

As a refrigerant for cooling the rotor 100 in the rotor cooling structure 10 according to an exemplary embodiment of the present disclosure, a cooling air, a cooling oil, a cooling liquid, or a cooling air containing a cooling oil in a form of a mist. If necessary, an oil mist supply device configured for spraying a cooling oil in a form of a mist toward the turbine blower 110 may be included. The oil mist supply device may be configured in such a way as to control the amount of oil mist supply to regulate cooling capacity by an induction motor controller. That is, the degree of cooling may be controlled by considering all factors into account, such as heat generation status and the rotation speed of the rotor 10.

The internal refrigerant passage 230 may be post-processed by a gun drill or deep hole drilling once a plurality of laminated steel sheets 150 and conductor bars 130 have been assembled, to fluidically communicate with holes of the refrigerant passage outlet openings 220 connected to the air gap 140 via the external periphery of the rotor 10. As stated above, the internal refrigerant passage 230 may be post-processed if the conductor bars 130 are formed by die casting. On the other hand, if the conductor bars 130 are assembled in a form of insertion conductor bars 130', at least portion of the internal refrigerant passage 230 may be formed on the conductor bars 130' by pre-processing.

Generally, the air gap 140, which is a gap between the stator 160 and rotor 10 of an induction motor, is very narrow: When only cooling air flows through the air gap 140, an exit of the air gap 140 formed all the way along the external periphery of the rotor 10 may have a volume large to allow for the flow of the cooling air, achieving a smooth flow of refrigerant. In contrast, when the cooling air includes an oil mist to increase the cooling effect, the oil mist may be at least partially adsorbed along the air gap 140, which may cause a rotation loss due to the viscosity of the oil. The external periphery of the rotor 10 according to various exemplary embodiments of the present disclosure may further include micro groove patterns 300. The micro groove patterns 300 may be formed on the external periphery of the rotor 10 to generate a dynamic pressure on both axial sides by the rotation of the rotor 10. That is, the micro groove patterns 300 may be formed to provide a flow pressure so that refrigerant is released toward both end portions from the center portion of the external periphery of the rotor 10.

Overall, the rotor cooling structure according to an exemplary embodiment of the present disclosure includes a turbine blower structure 100 in which the refrigerant passage 200 is provided adjacent to directly cool the conductor bars 130 and refrigerant is drawn into the refrigerant passage inlet openings 210, and also includes micro groove patterns 300 outside the refrigerant passage outlet openings 220, that extend along the air gap 140 and provide a flow pressure to release the refrigerant to both sides of the rotor 10. Moreover, the flow speed or flow rate of the refrigerant moving along the refrigerant passage 200 varies in proportion to the rotation speed of the rotor 10. Also, if an oil mist is further included, the cooling capacity may be regulated by controlling the amount of mist sprayed.

In an exemplary embodiment of the present invention, the refrigerant passage outlet openings 220 are formed along a central periphery on an external surface of the turbine blower structure 100 and the refrigerant passage inlet openings 210 are aligned symmetric with respect to the central periphery in a center axis of the rotor 10.

Figure 2:
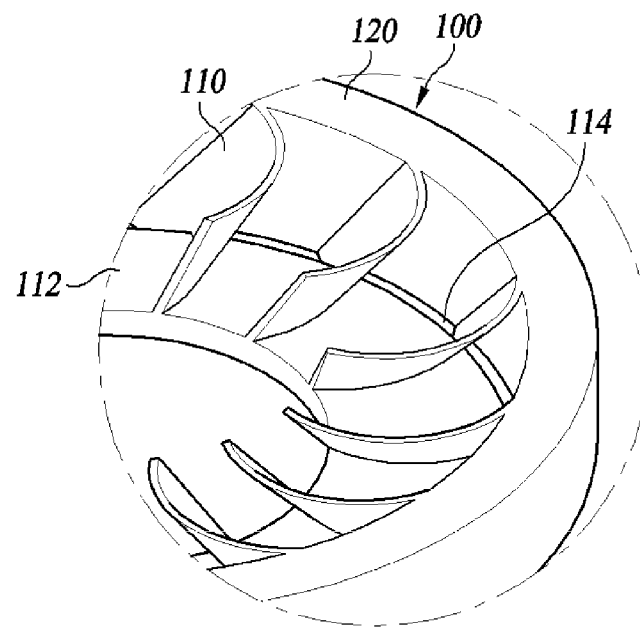
FIG. 2 schematically illustrates a blower structure on both sides of a rotor according to an exemplary embodiment of the present disclosure.

FIG. 2 schematically illustrates a blower structure on both sides of a rotor according to an exemplary embodiment of the present disclosure.

Referring to FIG. 2, the turbine blower structure 100 according to an exemplary embodiment of the present disclosure is configured to provide a flow radially inwardly from the end-ring 120 and toward the refrigerant passage inlet openings 210. A person of ordinary skill in the art may provide the shape and manufacturing method of the turbine blower structure 100 that suit a purpose according to an exemplary embodiment of the present disclosure, a detailed description of which will be omitted in the present disclosure.

Figure 3A:
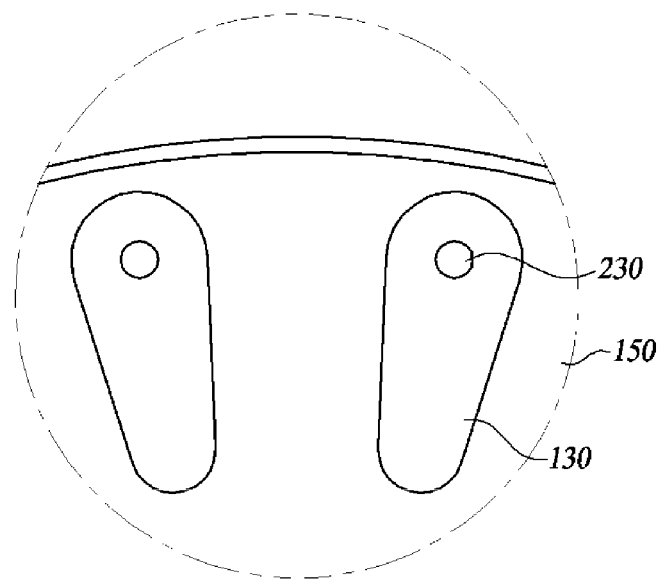
FIG. 3A and FIG. 3B illustrate a refrigerant passage provided on the inside or outside of a conductor bar according to an exemplary embodiment of the present disclosure.
Figure 3B:
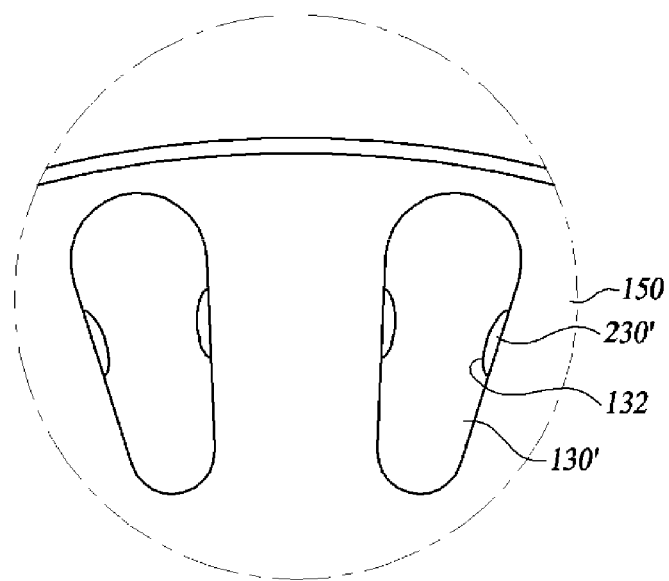

FIG. 3A and FIG. 3B illustrate a refrigerant passage provided on the inside or outside of a conductor bar according to an exemplary embodiment of the present disclosure.

Referring to FIG. 3A and FIG. 3B, the refrigerant passage 200 according to various exemplary embodiments of the present disclosure may be formed to penetrate the inside of the conductor bar 130, or the refrigerant passage 200 may be formed by assembling the conductor bar 130' to the laminated steel sheet 150 by grooves 132 preformed on the outside of the conductor bar 130'.

Meanwhile, a rifling structure, i.e., internal grooves having a predetermined pitch, may be formed inside a portion of the refrigerant passage 200 penetrating the inside of the conductor bar 130, to increase heat transfer efficiency.

Figure 4:
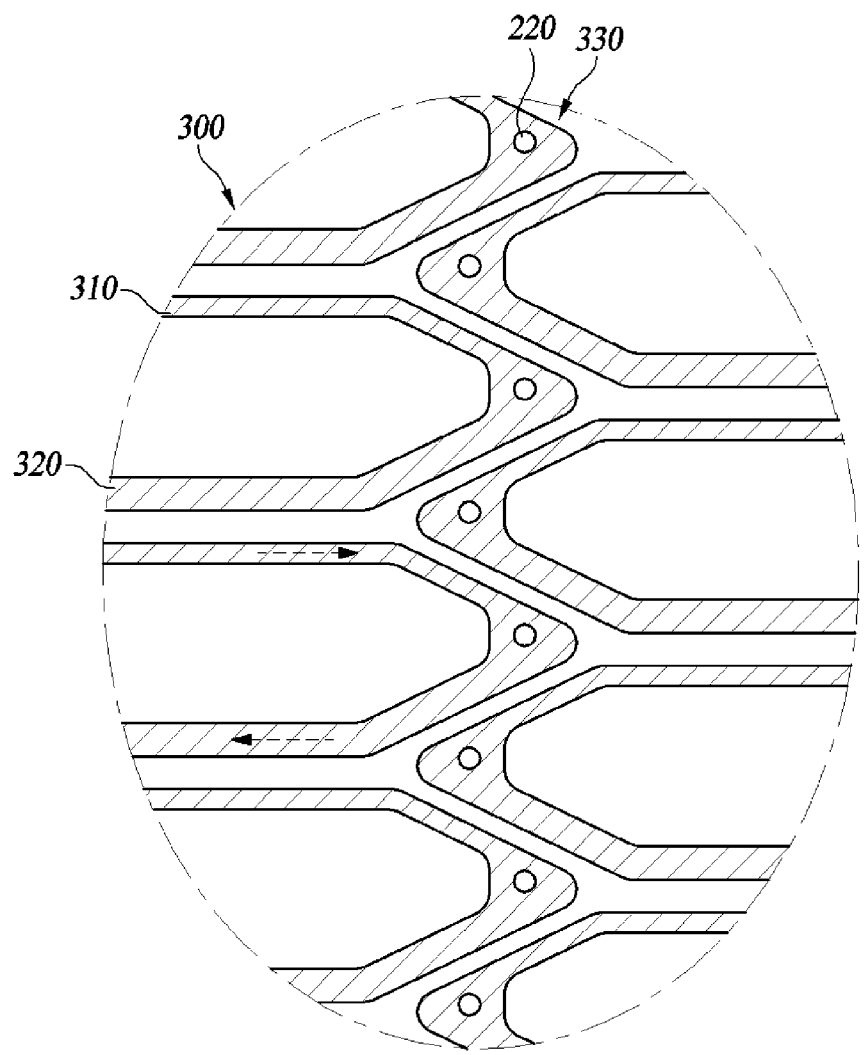
FIG. 4 illustrates groove patterns on the external periphery of the rotor according to an exemplary embodiment of the present disclosure.

FIG. 4 illustrates groove patterns on the external periphery of the rotor according to an exemplary embodiment of the present disclosure.

Referring to FIG. 4, the groove patterns according to an exemplary embodiment are formed to release the refrigerant discharged from the axial center of the rotor 10 to both sides of the rotor 10. The groove patterns 300 may be formed on the external periphery of the rotor 10 by making grooves in a predetermined pattern to a depth of several tens or hundreds of micrometers. The groove patterns 300 may be formed such that, along the circumference, grooves 310 on one side are narrower and grooves 320 on the other side are wider. As the rotor 10 rotates, the air, refrigerant, or oil mist-containing air on the air gap 140 generates different dynamic pressures on the grooves 310 on the one side and the grooves 320 on the other side by the micro grove patterns 300. In the illustrated exemplary embodiment of the present disclosure, the dynamic pressure generated on the wider grooves 320 on the other side is smaller than that on the grooves 310 on the other side, and therefore the refrigerant on the air gap 140 discharged through the refrigerant passage outlet openings 220 of the refrigerant passage 200 past the refrigerant passage 200 is released to both sides of the rotor 10 along the wider groove region. Accordingly, when the oil mist-containing refrigerant flows, the oil may be adsorbed into the air gap 140, causing no rotation loss, and the oil mist may be smoothly released toward both sides of the rotor because it absorbs heat as it passes through the refrigerant passage 200 of the rotor 10.

The micro groove patterns 300 may be chevron patterns, each with a pointed portion 330 holding the refrigerant passage outlet openings 220, that are formed in a zig-zag manner on both sides of the rotor 10 with respect to a cross-section of the axial center of the rotor 10. The micro groove patterns 300 may be formed by cutting the external periphery of the rotor 10 or by electrochemical machining or electrical discharge machining using a split mold surrounding the rotor 10 to make the manufacturing easier.

In an exemplary embodiment of the present disclosure, refrigerant is released along the air gap 140 on both sides of the axial center of the rotor 10. That is, temperature distribution is symmetrical on both sides of a longitudinal center of the rotor 10. This may be more desirable than the conventional method in which a turbine blower is provided only on one side of the rotor 10 and refrigerant flows only in one direction along the axis of the rotor 10.

Moreover, in an exemplary embodiment of the present disclosure, refrigerant may enter from both sides of the rotor 10 adjacent to the center of the axis of rotation and then be released to a radial external side of the rotor 10 on both sides of the rotor 10, thus providing smooth refrigerant flow. That is, the refrigerant passage inlet openings 210 may easily include a forced flow mechanism such as the turbine blower structure 100 to facilitate the entry of refrigerant, and the air gap 140, which may be narrow because of the motor structure, may be used as a refrigerant outlet, which allows for overall smooth circulation of refrigerant. Moreover, the shape of the refrigerant passage 200 as in the present exemplary embodiment allows the turbine blower structure 100 to be placed adjacent to the axis of rotation of the rotor 10, and this may lessen an effect of the turbine blower structure 100 on the rotation characteristics of the rotor 10. Furthermore, no additional complex components are needed unless a component for supplying an oil mist is further included. Another advantage is that the degree of cooling of the rotor 10 may be estimated at a predictable level by providing a forced circulation structure to both inlet and outlet regions through which refrigerant circulates, to provide a dynamic pressure required for refrigerant flow in proportion to rotation speed.

That is, the rotor cooling structure according to various exemplary embodiments of the present disclosure may offer the advantages of estimating the degree of cooling of the rotor 10 and therefore making modeling for thermal control easier, as well as improving cooling efficiency. The improvement in cooling efficiency may contribute to an increase in the maximum torque of induction motors and accurately detect the thermal behavior of the rotor 10. Accordingly, the temperature of the conductor bars 130 and the resistance of the conductor bars 130 based on the temperature may be accurately estimated, and as a result, the control precision of induction motors may be improved.

Meanwhile, it may be desirable that the flow pressure provided based on the rotation speed of the rotor 10 by the turbine blower structure 100 according to an exemplary embodiment of the present disclosure is higher than the flow pressure provided based on the rotation speed of the rotor 10 by the micro groove patterns 300.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A rotor cooling structure comprising:
    a turbine blower structure provided on first and second sides of a rotor for an induction motor;
    a refrigerant passage provided along conductor bars of the rotor and including:
        a plurality of refrigerant passage inlet openings provided on a bottom surface of the turbine blower structure;
        a plurality of refrigerant passage outlet openings provided at an axial center of the rotor; and
        a plurality of internal refrigerant passages fluidically connecting the refrigerant passage inlet openings and the refrigerant passage outlet openings; and
    a plurality of groove patterns that holds the refrigerant passage outlet openings therein and is provided on first and second axial sides of the rotor on an external periphery of the rotor,
    wherein the refrigerant passage inlet openings fluidically communicate to through-holes formed in a bottom surface of a turbine blower and the refrigerant passage outlet openings runs toward an air gap between the rotor and a stator of the induction motor.

2. The rotor cooling structure of claim 1, wherein the turbine blower structure is provided on a radial internal side of an end-ring connecting the conductor bars, and provides a flow from an internal periphery of the turbine blower structure toward an external periphery of the turbine blower structure and from the outside of the first and second sides of the rotor toward the first and second sides of the rotor.

3. The rotor cooling structure of claim 2, wherein the turbine blower structure is formed integrally with the radial internal side of the end-ring.

4. The rotor cooling structure of claim 1, wherein the refrigerant passage outlet openings are provided farther from a center axis of the rotor than the refrigerant passage inlet openings.

5. The rotor cooling structure of claim 4, wherein the internal refrigerant passages of the refrigerant passage have a slope having a predetermined angle toward the axial center as the internal refrigerant passages extend from the refrigerant passage inlet openings toward the refrigerant passage outlet openings.

6. The rotor cooling structure of claim 4, wherein the refrigerant passage outlet openings are formed along a central periphery on an external surface of the turbine blower structure and the refrigerant passage inlet openings are aligned symmetric with respect to the central periphery in a center axis of the rotor.

7. The rotor cooling structure of claim 1, wherein a flow pressure provided based on a rotation speed of the rotor by the turbine blower structure is higher than a flow pressure provided based on a rotation speed of the rotor by the groove patterns.

8. The rotor coil cooling structure of claim 1, wherein the refrigerant passage is formed by a groove formed on an external side of the conductor bars.

9. The induction motor comprising the rotor cooling structure of claim 1, further including an oil mist supply device on an external side of the turbine blower structure.

10. The induction motor of claim 9, wherein an amount of oil mist supply is controlled based on a heat generation status of the induction motor and a rotation speed of the rotor.

11. A rotor cooling structure comprising:
    a turbine blower structure provided on first and second sides of a rotor for an induction motor;
    a refrigerant passage provided along conductor bars of the rotor and including:
        a plurality of refrigerant passage inlet openings provided on a bottom surface of the turbine blower structure;
        a plurality of refrigerant passage outlet openings provided at an axial center of the rotor; and
        a plurality of internal refrigerant passages fluidically connecting the refrigerant passage inlet openings and the refrigerant passage outlet openings; and
    a plurality of groove patterns that holds the refrigerant passage outlet openings therein and is provided on first and second axial sides of the rotor on an external periphery of the rotor,
    wherein the groove patterns are chevron patterns, each with a pointed portion holding the refrigerant passage outlet openings therein, and
    wherein the groove patterns are formed in a zig-zag manner on the first and second sides of the rotor with respect to an axial central cross-section of the rotor.

12. The rotor cooling structure of claim 11, wherein, along a circumference of the rotor, a first width of the chevron patterns on the first side is narrower than a second width of the chevron patterns on the second side, to generate dynamic pressure by the rotation of the rotor.

13. The rotor cooling structure of claim 11, wherein the chevron patterns have a groove depth of predetermined tens or hundreds of micrometers.

14. A rotor cooling structure comprising:
- a turbine blower structure provided on first and second sides of a rotor for an induction motor;
- a refrigerant passage provided along conductor bars of the rotor and including:
  - a plurality of refrigerant passage inlet openings provided on a bottom surface of the turbine blower structure;
  - a plurality of refrigerant passage outlet openings provided at an axial center of the rotor; and
  - a plurality of internal refrigerant passages fluidically connecting the refrigerant passage inlet openings and the refrigerant passage outlet openings; and
  - a plurality of groove patterns that holds the refrigerant passage outlet openings therein and is provided on first and second axial sides of the rotor on an external periphery of the rotor,
- wherein the refrigerant passage is provided to penetrate the conductor bars.

15. The rotor coil cooling structure of claim 14, wherein grooves including a predetermined pitch are formed on an internal periphery of the refrigerant passage.

* * * * *